(12) United States Patent
Kasichainula (10) Patent No.: US 11,216,408 B2
(45) Date of Patent: *Jan. 4, 2022

(54) TIME SENSITIVE NETWORKING DEVICE

(71) Applicant: Intel Corporation, Santa Clara, CA (US)

(72) Inventor: Kishore Kasichainula, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,258

(22) Filed: Aug. 24, 2020

(65) Prior Publication Data

US 2021/0097019 A1 Apr. 1, 2021

Related U.S. Application Data

(63) Continuation of application No. 16/230,829, filed on Dec. 21, 2018, now Pat. No. 10,754,816.

(51) Int. Cl.
*G06F 15/173* (2006.01)
*H04L 12/46* (2006.01)
*H04L 12/863* (2013.01)
*H04L 12/875* (2013.01)

(52) U.S. Cl.
CPC .... *G06F 15/17331* (2013.01); *H04L 12/4645* (2013.01); *H04L 47/564* (2013.01); *H04L 47/6215* (2013.01)

(58) Field of Classification Search
CPC ........... G06F 15/17331; H04L 12/4645; H04L 47/564

USPC ........................................................ 709/212
See application file for complete search history.

(56) References Cited

U.S. PATENT DOCUMENTS

| | | |
|---|---|---|
| 8,996,840 B2 | 3/2015 | Auernhammer et al. |
| 10,754,816 B2 | 8/2020 | Kasichainula |
| 2003/0165160 A1 | 9/2003 | Minami et al. |
| 2004/0030745 A1 | 2/2004 | Boucher et al. |
| 2005/0083952 A1 | 4/2005 | Swain |
| 2010/0191865 A1 | 7/2010 | Wang et al. |
| 2019/0121781 A1 | 4/2019 | Kasichainula |

OTHER PUBLICATIONS

U.S. Appl. No. 16/230,829 U.S. Pat. No. 10,754,816, filed Dec. 21, 2018, Time Sensitive Networking Device.
"U.S. Appl. No. 16/230,829, Notice of Allowance dated Apr. 22, 2020", 9 pgs.

*Primary Examiner* — Wing F Chan
*Assistant Examiner* — Leon Y Tseng
(74) *Attorney, Agent, or Firm* — Schwegman Lundberg & Woessner, P.A.

(57) ABSTRACT

The present disclosure generally relates to a device, method, or system for time sensitive networking. In an example, the device can include a time-sensitive networking controller and a scheduler. The device also includes an enhanced gate control list maintained on the time-sensitive networking controller to include a direct memory access address, a launch time, and a pre-fetch time for a data packet. The device may also include a transmitter of the time-sensitive networking controller to transmit the data packet retrieved using the direct memory access address at the launch time identified by the scheduler.

25 Claims, 7 Drawing Sheets

TIME SENSITIVE NETWORKING DEVICE

TECHNICAL FIELD

The present techniques relate generally to time sensitive networking. More specifically, the present techniques relate to a time sensitive networking device that makes use of an enhanced gate control list, sometimes making use of multiple queues, launch times for specific packets of data, and look-up tables where look-ups are local to the networking device.

BACKGROUND ART

Networking devices can receive requests from applications that specific packets of data be transmitted to another end device on a network. A network interface controller (NIC) is a hardware device that does the transmission and reception of data to and from an end device on a network. Application software that is running on a local system can create or uses the data to be transmitted by a networking device such as the NIC. A NIC that is on the system does the actual transmission and reception of the data. The requests and instructions for transmission may not come with an address location for the location of the data on the local device. Instead a descriptor of the location of the data is currently provided by the NIC to the location of the data in main memory of the local device. Using the descriptor, the networking device may request through a bus and processor an address based on the descriptor. Once the processor returns the address for the data packet, the networking device may retrieve and transmit the data packet to the end device.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The present disclosure relates to computer networking components that use a local look-up table thereby reducing latencies in data retrieval and transfer. In an example, an NIC can implement a local look-up table called an enhanced gate control list. Using the enhanced gate control list, the NIC scheduler can execute a direct memory access (DMA) of the target data directly as well as schedule the data fetches according to queue traffic class. This scheduling is made possible by the use of local look-up tables, but also through the knowledge of the time when data will be requested, expected by the application using the data. The ability of a NIC, or other computer networking hardware to access data directly by having a local look-up table rather than requesting a look-up through a central processor unit (CPU) increases the available CPU cycles. The local look-up table and the ability to pre-fetch data and addresses for DMA to execute when expected allow the CPU both more work load consolidation, more determinism, and reduction in end-to-end latencies. The use of a local look-up table can also be split into multiple queues within the look-up table where each queue corresponds to a traffic class. Using the multiple traffic class queues allows precise per packet per traffic class scheduling and improved overall cycle jitter as offsets can be incorporated into transmission scheduling.

The present techniques may make use of time deterministic standards for networking hardware. In one example of such standards, the IEEE deterministic networking referred to collectively as Time Sensitive Networking (TSN) can provide data transfer scheduling across the network. As a result of the time sensitive nature of these types of standards, embedded designs in the industrial and automotive space can include TSN controllers.

The present disclosure incorporates an enhanced gate control list (EGCL). The EGCL includes of memory address, size of payload, pre-fetch time and other control parameters to achieve low latency and determinism. An example networking hardware such as a time sensitive NIC maintains EGCL with the ability to serve predetermined memory locations. These memory locations served by the NIC can be directly programmed by the application one time before beginning of the operation or can be programmed periodically per frame.

In an example, once the EGCL is programmed, the NIC can perform direct memory accesses (DMAs) of the data at predetermined time, called pre-fetch time, before the launch time of the packet. Using DMAs allows the payload of the data packet to be directly fetched without going through descriptors or the CPU. This direct retrieval of the data packet using a DMA reduces end-to-end latency and improves determinism as a result of the DMA being known and scheduled for a specific packet of data.

Using a data look-up table such as the enhanced gate control list at the example NIC reduces the requests and complexity occurring managed by the application software via execution on the CPU. This frees CPU cycles to process more data resulting in shorter end-to-end cycle time and more work load consolidation.

In the following disclosure, numerous specific details are set forth, such as examples of specific types of processors and system configurations, specific hardware structures, specific instruction types, specific system components, etc. in order to provide a thorough understanding of the present disclosure. It can be apparent, however, to one skilled in the art that these specific details need not be employed to practice the presently disclosed techniques. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the presently disclosed techniques.

The present disclosure also discusses uses of multiple queues locally on the time sensitive networking equipment, such as the NIC. The use of multiple queues enables various traffic classes and distinction between express packets with high priority and best effort traffic with low priority. In an example, express packets can be mapped to a Queue-1 and the Queue-1 may be mapped to an express traffic class (TC1). The data flow on TC1 can be routed on a channel of the networking component called Virtual Channel 1 which can be reserved for real-time traffic. The use of virtual local area networks (VLAN) identifiers can enable mapping of VLAN to traffic class (TC) to virtual channel (VC). These mappings provide low latency paths for the time sensitive real-time data. Use of VLAN to map traffic class can further ensure QoS all the way from application to the Ethernet wires, WiFi antenna, or other Internet communication hardware. Best effort traffic with low priority can be mapped to traffic class 0 (TC0) and can be routed on virtual channel 0 (VC0) which is shared with numerous other input/output devices. The best effort traffic is used for non-time-critical traffic and the latencies are not guaranteed.

Figure 1:
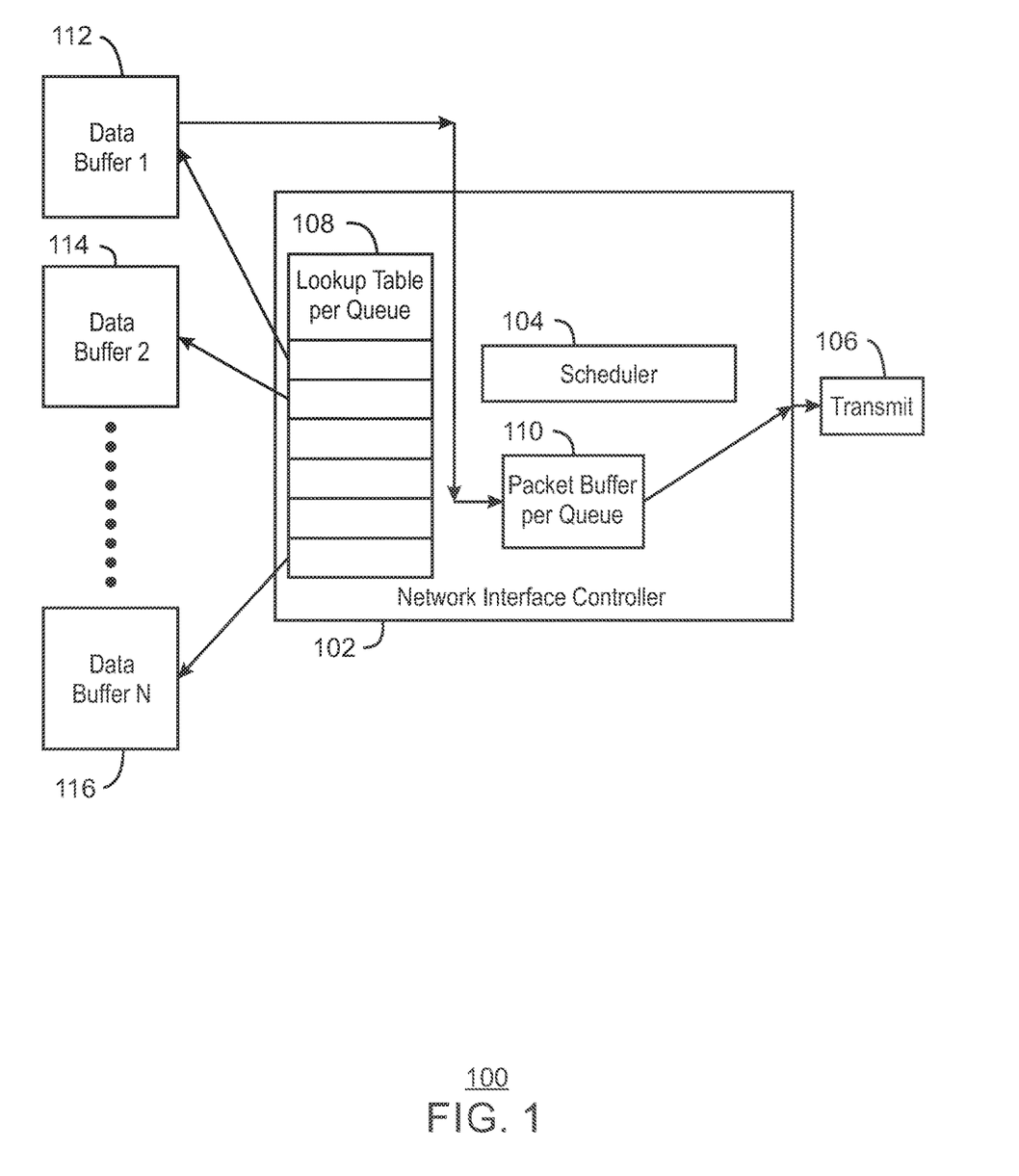
FIG. 1 is a schematic diagram of an example network interface system to manage direct memory access in time sensitive networking ecosystems.

FIG. 1 is a schematic diagram of an example network interface system 100 to manage direct memory access in time sensitive networking ecosystems. The networking interface system 100 can include a networking interface controller (NIC) 102 or other controller that can manage the retrieval and transmission of data at a known time. Within the NIC 102, a gate control list can be initialized by an application. The application can be requesting transmission of data through the NIC 102 along an outward facing data transmission path towards another device such as an Ethernet connection, a wireless connection, or other connection type. The gate control list governs the timing of events based on the predetermined schedule provided for each event. By controlling the timing of events that occur the gate control unit can control the data flow through the NIC 102. The scheduler 104 works in coordination with the control gate list to control data flow according to the schedule determined from the control gate list. To initialize the gate control list in the NIC 102 a test may first be made as to whether or not the NIC 102 is connected and enabled to transmit 106 data outside of the NIC 102 with the gate control list initializing if the connection is confirmed.

The gate control list can include a number of queues. Each queue can be a look-up table 108. Each queue of the gate control list can also be enabled to trigger a direct memory access (DMA). Data retrieved by the NIC 102 in response to a scheduler 104 retrieving data according to the gate control list, the NIC may store this retrieved data for transmission in a packet buffer 110. In an example there may be an internal packet buffer 110 for each queue in the gate control list. In an example, each packet buffer 110 may correspond with the look-up table 108 for a particular queue of the control gate list. When the data has arrived in packet buffer 110, the scheduler 104 may schedule the transmission of the data in the packet buffer 110. As discussed above, the NIC 102 may transmit 106 data to another device or to a data communication channel such as an Ethernet connection.

As disclosed herein, the gate control list may be enhanced to account for timing of data retrieval, time data will be used by a requesting application, and other time based requests from a device, system, or application. Such an enhanced gate control list may have other enhancements as well. An enhanced gate control list in the NIC may include timing information about the timing data should be made available to the internal packet buffer 110. In an example, the enhanced gate control may provide information to the scheduler to that the scheduler identifies a specific order that the NIC 102 should retrieve data from data buffers. The sequence of data requests may be made from a look-up table 108 or a number of look-up tables based on the information for the timing for each requested piece of data. When the scheduler 104 determines that a specific data identified in the look-up table 108 should be retrieved, that first data can be retrieved from a data buffer 1 112.

As this data is retrieved, the data may be held in the packet buffer 110 prior to transmission 106. Based on the enhanced gate control list, a look-up table 108 may also provide information to a scheduler indicating that the data lists in the look-up table 108 can be retrieved at a particular time or within a time range. In an example, the second piece of data retrieved may be from a data buffer 2 114 based on information provided in the look-up table regarding timing metrics of the data to be requested. The data packet retrieved from the data buffer 2 114 may be provided to the packet buffer 110. This process may continue through each of the listings in the look-up table 108 until data is requested from Data buffer N 116, where N corresponds to the total number of requests that a look-up table 108 will make per queue in the enhanced gate control list. The scheduler 104 can start executing from first row of the queue using the look-up table 108 and progress sequentially across the gate control list until it reaches the last row of the queue via the look-up table 108.

Figure 2:
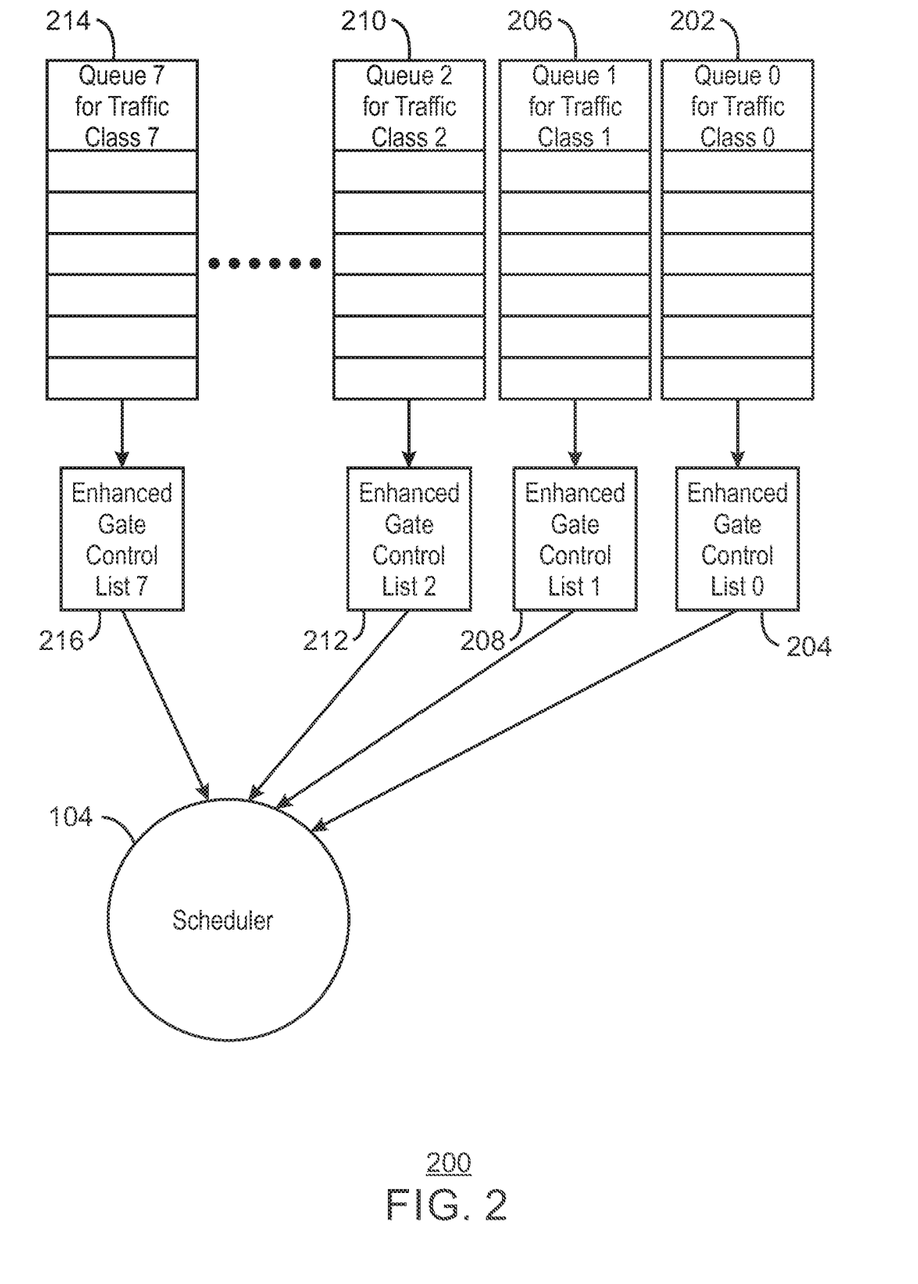
FIG. 2 is a schematic diagram of an example multi-queue using enhance gate control lists.

Additionally, as described with respect to FIG. 2, the enhanced gate control list may utilize a number of queues each with their own look-up table 108. The enhanced gate control list may work in concert with the scheduler 104 to identify a sequence and timing during which each look-up table will provide the address for data retrieval from a data buffer. In this way, multiple queues can be managed more efficiently to utilize the time data to increase overall throughput speed and determinism in a NIC 102.

FIG. 2 is a schematic diagram of an example multi-queue using enhanced gate control lists 200. Like numbered items, such as the scheduler 104, are as described in FIG. 1.

When the NIC or other transmission device, component, or system makes use of enhanced gate control list, such a controller may contain multiple queues each embodied through their own look-up table. In an example, each look-up table has a number of rows each with a corresponding data address that may be requested from data buffers as illustrated in FIG. 1. The multiple queues for various traffic classes may also segregate data flow through the scheduler 104 and NIC based on a virtual local area network identification (VLAN ID) or other identification. Using the VLAN ID or other identification marker, the queues can be mapped to various traffic classes based on the priority to provide quality of service. For example, one queue may include packets that are to be delivered in real time, without delay, other queues may include "best effort" packets that can be delayed and are not urgent. The stratification of traffic classes can be extended to match the number of queues created within the NIC.

In an example, a scheduler 104 may coordinate the sending of packets from a queue 0 for traffic class 0 202 with an associated enhanced gate control list 0 204. The enhanced gate control list 0 204 may include information about the data packets that are to be retrieved using the queue 0 for traffic class 0 202. Likewise, the scheduler 104 may coordinate the sending of packets from a queue 1 for traffic class 1 206 with an associated enhanced gate control list 1 208. The enhanced gate control list 1 208 may include information about the data packets that are to be retrieved using the queue 1 for traffic class 1 206. Similarly, the scheduler 104 may coordinate the sending of packets from a queue 2 for traffic class 2 210 with an associated enhanced gate control list 2 212. The enhanced gate control list 2 212 may include information about the data packets that are to be retrieved using the queue 2 for traffic class 2 212. This pattern may continue for each of the multiple queues enabled for a NIC. In the example shown in FIG. 2, the scheduler 104 may coordinate as many as eight queues for eight different data classes as the retrieval of packets for a queue 7 for traffic class 7 214 is shown with its associated enhanced gate control list 7 216. The enhanced gate control list 7 216 may include information about the data packets that are to be retrieved using the queue 7 for traffic class 7 214. While the enhanced gate control lists 7 216 are shown separately to provide information about their respective queues, reference to an enhanced gate control list can include all of the various enhanced gate control lists used by a scheduler 104 collectively. For example, stating the scheduler 104 would make use of the enhanced gate control list for multiple queues could include an enhanced gate control list that had a subpart, which the subpart by itself providing information for its particular queue. Accordingly, the multiple enhanced gate control lists shown in FIG. 2 can also be thought of collectively as a single enhanced gate control list with many different constituent parts used in managing the data retrieval and flow from the various queues.

For each queue, the enhanced gate control list can include at least two parts for the next row in the queues sequence. A first part of the enhanced gate control list for a queues can include the location of the packet data. A first part of the enhanced gate control list for a queues can include the timing details of the packet data to next be retrieved from the queue.

In an example, the first part of the enhanced gate control list for a specific queue can provide a retrieval location for the packet or part of the packet in the main memory and the size of the data. These locations may be in main memory or other attached memory depending on the device in which the scheduler is operating. The enhanced gate control list may obtain this location information from the rows of the queue the enhanced gate control list serves.

Figure 3:
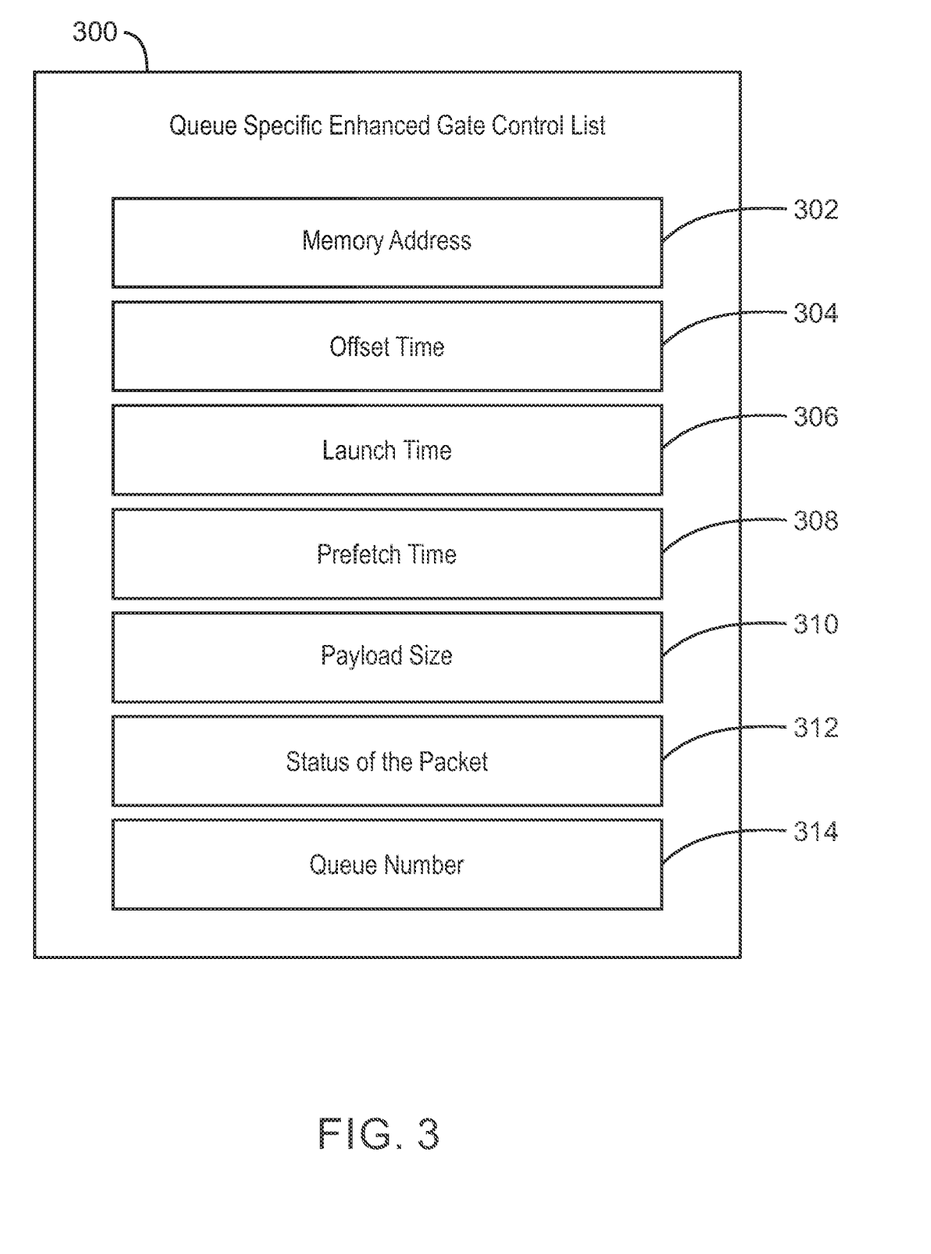
FIG. 3 is a block diagram of an example queue specific enhanced gate control list.

In an example, the second part of the enhanced gate control list for a specific queue specifies when to fetch the data from memory and when to transmit this packet. These times may be relative to a specific clock in the NIC or may be a clock signal provided by the scheduler or central processing unit. In an example, each row of the look-up table in the corresponding queue of the enhanced gate control list contains the time fields for the second part of the enhanced gate control list. In another example, each row of the queues shown in FIG. 2 can have a format and information as shown in FIG. 3 to be provided to the enhanced gate control lists.

In one example for FIG. 2, each row entry in the queue can contain the direct address location of data in the main memory. By having the direct address location without having to make a request outside of the NIC 102, the scheduler 104 using the enhanced gate control list can do a DMA at a specified time without the delay of an address request. The precision of the time is useful in pre-fetching the data that may next be transmitted through the scheduler 104.

In one example, the scheduler 104 begins executing the collective gate control list of each queue, or a single queue if only one queue exists, when the application enables the DMA by writing into DMA enable register. An internal accumulator, such as the internal packet buffer of a NIC in concert with the scheduler 104, can be used to add each row from a queue at a desired and scheduled time interval specific to the data. Data may have a specific time interval based on the requested quality of service identified for that packet. Data may also have a specific time interval or schedule based on the application requesting the data at a specific time or rate. The scheduler 104 in concert with a packet buffer may retrieve the data from a specific row that has been called for a specific time while also scheduling the next event.

In one example using a single queue, a scheduler 104 starts executing from a first row in the queue and progresses sequentially across the gate control list until it reaches the last row of the queue. The enhanced gate control list may still provide time intervals and schedules for each of the rows so that if no data is data is requested during a given time interval idle packets may instead be transmitted.

In one example using multiple queues, as in FIG. 2, the scheduler 104 identifies the current row entry for each of the multiple queues using the information provided by the enhanced gate control list. For example, for queue 0, the enhanced gate control list 0 204 may provide a current row for queue 0. For queue 1, the enhanced gate control list 1 208 may provide a current row for queue 1. For queue 2, the enhanced gate control list 2 210 may provide a current row for queue 2, and so on where for the other queues. A final queue in this example, queue 7 may provide a current row for queue 7 through the enhanced gate control list 7 216. As the enhanced gate control list for each of these queues includes both time and location information about the data packet to be retrieved, the scheduler 104 is able to not only perform a data access from memory for transmission that needs to be transmitted in current time, but may also schedule the next data packet to be transmitted.

Using this information, the enhanced gate control list may pre-fetch the address information in order to access that data packet through a direct memory. Fetching this address prior to the scheduled transmission of the data enables a faster and more determinative transmission of data by the scheduler. As used herein, deterministic transmission refers in part to the reliability and efficiency that is enabled by a system that knows what data it will transmit and when the data will be sent. With this information, a receiving system or component can be prepared to receive and process that information at a specific time rather than waiting for the packet to be requested, retrieved, and then transmitted. By enabling the enhanced gate control list to retrieve the direct memory access address information prior to the scheduled transmission time, the scheduler 104 is able to preemptively perform these operations prior instruction received at the scheduler 104 or NIC.

In another example, queues 0, queue 1, and a scheduler 104 may account for pre-fetch and launch time as revealed about the data in the enhanced gate control list of the respective queues. For example, the scheduler 104 can sequence events, such as packet retrieval across queues 0 and 1 based on the pre-fetch time and launch time. In an example, consider a packet A, B, and C listed in rows of queue-0 have to be transmitted at 10 microseconds, 20 microseconds, and 30 microseconds, respectively. In this example, consider a packet D listed in a row of queue-1 to be transmitted at 40 microseconds. In this example, the scheduler 104 will read the first row of queue-0 and first row of queue-1 and through the information provided by the enhanced gate control list for each queue, determine that packet A from queue-0 needs to be transmitted at 10 us and the size of packet A takes 10 microseconds to transmit. In this example, the scheduler 104 checks if the first packet from queue-1, packet D, can be transmitted at 20 microseconds. Since packet D in queue-1 is scheduled for 40 microseconds, the scheduler 104 reads the next row of queue-0 to determine if the packet retrieved, packet B, can be transmitted before the scheduled time for packet D at 40 microseconds. Since packet B is scheduled for 20 microseconds with a 10 microsecond transmit time, the scheduler 104 knows packet B can be scheduled and transmitted prior to the scheduled time for packet D. The scheduler 104 will then pre-fetch the data for packet B and will transmit the packet B.

This process of checking can be repeated for multiple queues using the information provided regarding scheduled times and transmit times to efficiently schedule and pre-fetch data packets for transmission. As noted above, when data packets can be pre-fetched for transmission they may be stored in a transmit buffer for transit while the scheduler 104 identifies the next packet to retrieve from the queues.

In this example, if the scheduler 104 finds there is no packet among the number of queues scheduled to be transmitted between 10 microseconds and 40 microseconds, then the scheduler 104 transmits idle packets on the transmit line of the NIC until the scheduler 104 finds next packet that can be transmitted when scheduled. However, by searching each queue for packets that may be transmitted between the scheduled packet transmission of queue-1 and queue-0, the scheduler 104 using the enhanced gate control list described here avoids sending idle packet entries when other packets can instead be sent. Using the techniques described for the scheduler 104 using the enhanced gate control list, queues with empty entries that would have been entered on the gate control list for transmission can be avoided and that time can instead be filled by a scheduler 104 pre-fetching data from other queues and transmit these data packets rather than idle packets.

FIG. 3 is a block diagram of an example queue-specific enhanced gate control list 300. The queue-specific enhanced gate control list 300 shown here is one example of the information that can be incorporated into the systems, components, queues, and schedulers shown in FIG. 1 and FIG. 2.

The queue-specific enhanced gate control list 300 provides a memory address 302 for a data packet to be retrieved. This data packet address information can come from the row of the queue associated with the queue specific enhanced gate control list 300. In an example, the memory address 302 can be an address in the main memory of a system. The memory address 302 can be a 64-bit address for the data in the main memory. This address information can be provided to a scheduler in order to perform a DMA for the data at a scheduled time.

The queue-specific enhanced gate control list 300 provides an offset time 304 to a scheduler. In an example, the offset time may be encoded in 32 bits. As used herein, the offset time is for repeated operations. The scheduler will fetch the data from same address location at fixed intervals without need for enhanced gate control list updates. For example, packets to be sent from fixed location at every at an example rate of once every millisecond, then the scheduler can read this location for every millisecond and send the data that is located in that location. This frees up the software scheduling and preparation of the EGCL. The software may dump the new data at that identified location, and the scheduler picks up the dumped data up at a known time. By adding the offset time 304 to the current launch time of the scheduler, a new launch time 306 for a specific packet may be calculated.

The queue-specific enhanced gate control list 300 may include the launch time 306 measured from the beginning of each frame with the addition of the offset time 304. The launch time 306 included in the queue-specific enhanced gate control list 300 can refer to the scheduled launch time 306 of a specific data packet listed in a row of a queue. As discussed above with respect to FIG. 1 and FIG. 2, the launch time may be used by the scheduler to determine which packet from which queue should be retrieved or transmitted and when.

The queue-specific enhanced gate control list 300 may also include a pre-fetch time 308. As used herein, the pre-fetch time refers to the time it takes a NIC or a scheduler to fetch the data packet from a data buffer and place it into a transmit buffer. The pre-fetch time 308 can be used in coordination with the launch time to determine if sufficient time for pre-fetching exists. In an example, a scheduler compares a queue's next scheduled packet launch time with the launch time 306 and pre-fetch time 308 of the present queue. Using this comparison, the scheduler can determine if there is sufficient time to pre-fetch and then launch the data of the queue associated with the queue-specific enhanced gate control list 300. In an example, the pre-fetch time 308 can tell the scheduler how soon before the launch of a packet the data can be fetched or accessed through a DMA. The numerical value of the pre-fetch time 308 can be small for express packets and large for best effort packets.

The queue-specific enhanced gate control list 300 may include a payload size 310. In an example, the payload size can be for a maximum of 2 KB. The payload size may be useful for identifying the appropriate amount of data that may be retrieved for a transmit buffer or transmitted within a particular time frame. For example if the transmit buffer does not have space for the entire size of the data packet based on the payload size 310, then the retrieval and transmission may need to be split and scheduled to accommodate multiple retrievals and transmissions.

In an example, the queue-specific enhanced gate control list 300 may include a status of the packet 312. The status of the packet can be 2 bits to indicate the nature of the packet providing the gate control information. In an example, the queue-specific enhanced gate control list 300 may provide this information in a packet to the scheduler and various status and control indications may need to be conveyed about the packet providing the information of the queue-specific enhanced gate control list 300 to the scheduler. These status and control information is included in the status of the packet 312.

The queue-specific enhanced gate control list 300 may also include a queue number 314 for systems where multiple queues are being implemented. In the example of FIG. 2 for example, the queue number 314 of the queue-specific enhanced gate control list 300 could be one of eight different queues, i.e. 0-7. In an example, the queue number 314 can be indicated with a 3-bit number. In cases where the queue number 314 is a 3-bit number, the number of queues can be limited to eight queues. The scheduler uses the queue number 314 provided in the queue-specific enhanced gate control list 300 to identify and associate the information provided with a specific queue so that the scheduler may compare queues effectively. For example, the process shown in FIG. 2 provides an example where the launch and pre-fetch times of packets listed in various queues was compared between the queues by the scheduler. The scheduler, when requesting information from each queue specific enhanced gate control list 300 will be able to make the comparison when it has the specific queue the other data, e.g. launch time and pre-fetch time, is representing.

All of the information in the queue-specific enhanced gate control list 300 may be provided to a scheduler from each of multiple queues either one at a time or at the same time depending on the function of the scheduler. The scheduler may use the information obtained from each of the queue specific enhanced gate control lists in order to transmit data packets with current launch times while scheduling packets with later launch times.

Figure 4:
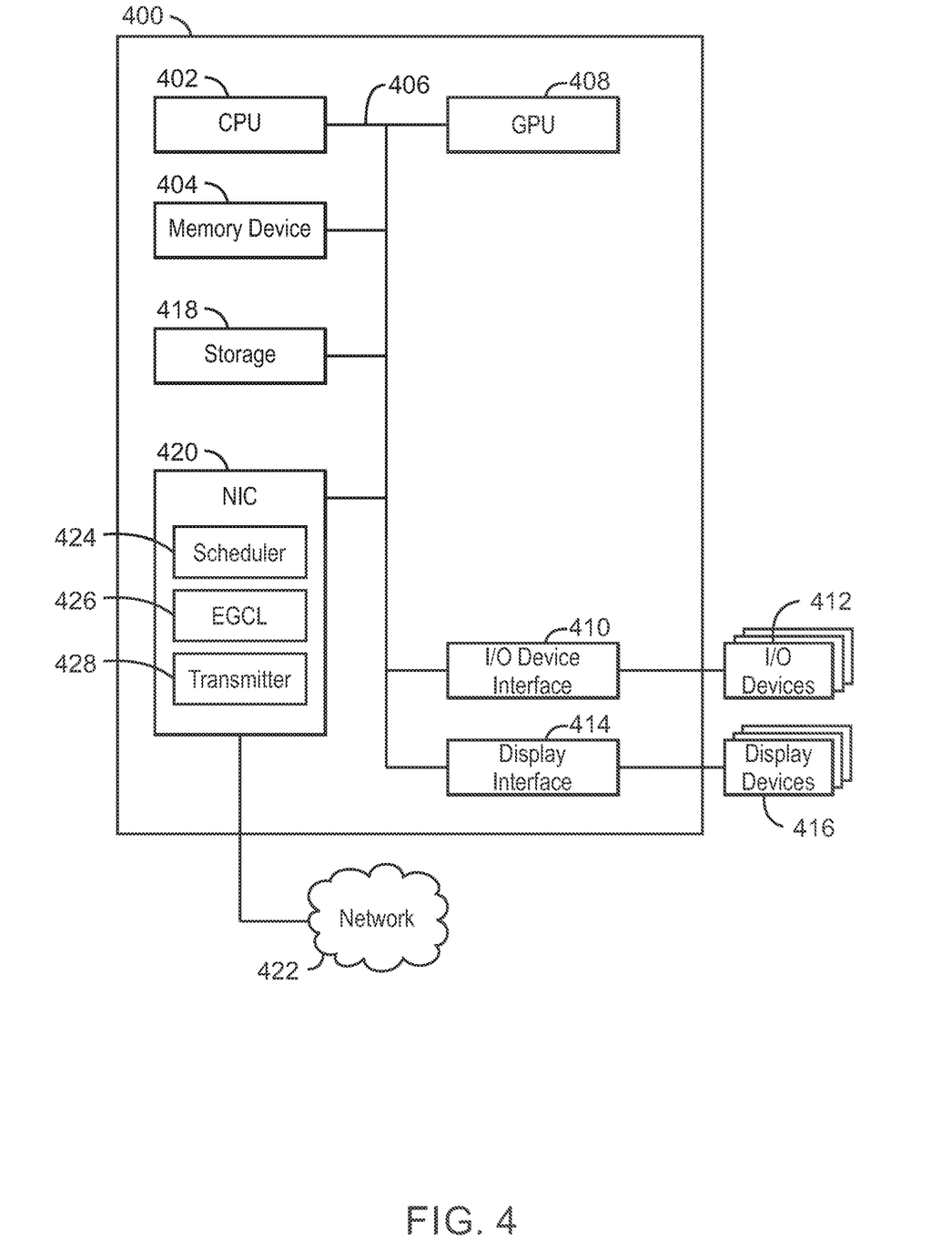
FIG. 4 is a block diagram illustrating an example computing device for time sensitive networking.

FIG. 4 is a block diagram illustrating an example computing device 400 for time sensitive networking. The computing device 400 may be, for example, a laptop computer, desktop computer, tablet computer, mobile device, or server, among others. The computing device 400 may include a central processing unit (CPU) 402 that is configured to execute stored instructions, as well as a memory device 404 that stores instructions that are executable by the CPU 402. The CPU 402 may be coupled to the memory device 404 by a bus 406. Additionally, the CPU 402 can be a single core processor, a multi-core processor, a computing cluster, or any number of other configurations. Furthermore, the computing device 400 may include more than one CPU 402. The memory device 404 can include random access memory (RAM), read only memory (ROM), flash memory, or any other suitable memory systems. For example, the memory device 404 may include dynamic random access memory (DRAM).

The computing device 400 may also include a graphics processing unit (GPU) 408. As shown, the CPU 402 may be coupled through the bus 406 to the GPU 408. The GPU 408 may be configured to perform any number of graphics operations within the computing device 400. For example, the GPU 408 may be configured to render or manipulate graphics images, graphics frames, videos, or the like, to be displayed to a user of the computing device 400.

The memory device 404 can include random access memory (RAM), read only memory (ROM), flash memory, or any other suitable memory systems. For example, the memory device 404 may include dynamic random access memory (DRAM).

The CPU 402 may also be connected through the bus 406 to an input/output (I/O) device interface 410 configured to connect the computing device 400 to one or more I/O devices 412. The I/O devices 412 may include, for example, a keyboard and a pointing device, wherein the pointing device may include a touchpad or a touchscreen, among others. The I/O devices 412 may be built-in components of the computing device 400, or may be devices that are externally connected to the computing device 400. In some examples, the memory device 404 may be communicatively coupled to I/O devices 412 through direct memory access (DMA).

The CPU 402 may also be linked through the bus 406 to a display interface 414 configured to connect the computing device 400 to a display device 416. The display device 416 may include a display screen that is a built-in component of the computing device 400. The display device 416 may also include a computer monitor, television, or projector, among others, that is internal to or externally connected to the computing device 400.

The computing device also includes a storage device 418. The storage device 418 is a physical memory such as a hard drive, an optical drive, a thumbdrive, an array of drives, or any combinations thereof. The storage device 418 may also include remote storage drives.

The computing device 400 may also include a network interface controller (NIC) 420. In an example the NIC 420 may be time sensitive. In an example, time sensitive can refer to the NIC having a time based reference relative to a data frame being provided or requested by an application. The NIC 420 may be configured to connect the computing device 400 through the bus 406 to a network 422. The network 422 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The NIC 420 may also include a scheduler 424, an enhanced gate control list (EGCL) 426, and a transmitter 428 to enable time sensitive networking. In an example, the scheduler 424, EGCL 426, and transmitter 428 may all work together to allow local pre-fetching of data packets for transmission to a requesting application using direct memory accesses that bypass the CPU 402. In an example the EGCL 426 is maintained on the NIC 420 and includes a direct memory access address, a launch time, and a pre-fetch time for a data packet.

In an example, the EGCL 426 includes a number of look-up queues, where each of the number of look-up queues includes a number of rows in which data packet information can be stored for retrieval by the scheduler 424. In an example, the number of look-up queues can correspond to a different traffic class where each different traffic class has a differing quality of service. In this example, the scheduler 424 can compare a front-of-queue data packet in each of the number of look-up queues and pre-fetches a queue data packet with a scheduled launch time matching the current time of the scheduler 424. The scheduler 424 may also compare a front-of-queue data packet in each of the number of look-up queues and pre-fetches a queue data packet where a sum of the scheduled launch time and transmit time of the queue data packet does not conflict with a scheduled launch of a future scheduled data packet.

In an example the transmitter 428 may transmit the data packet retrieved using the direct memory access address at a launch time identified by the scheduler. The NIC 420 may be a time-sensitive networking controller that includes a packet buffer. In this example, a data packet can be transmitted from the packet buffer for which the data packet was requested by the scheduler 424 at the pre-fetch time. The time-sensitive networking controller also may apply a virtual local area network labels to application requested data packets that are then sorted into a number of queues in maintained by the enhanced gate control logic, wherein the virtual local area network labels correspond to the traffic class of the application requested data packets in each of the number of queues. In an example, the transmitter 428, EGCL 426, and scheduler 424 are all located local to the time-sensitive networking controller such as the NIC 420 and the memory accesses using the direct memory access address do not include a query to a CPU 402.

The block diagram of FIG. 4 is not intended to indicate that the computing device 400 is to include all of the components shown in FIG. 4. Rather, the computing device 400 can include fewer or additional components not illustrated in FIG. 4, such as additional USB devices, additional guest devices, and the like. The computing device 400 may include any number of additional components not shown in FIG. 4, depending on the details of the specific implementation. Furthermore, any of the functionalities of the CPU 402 may be partially, or entirely, implemented in hardware and/or in a processor.

Figure 5:
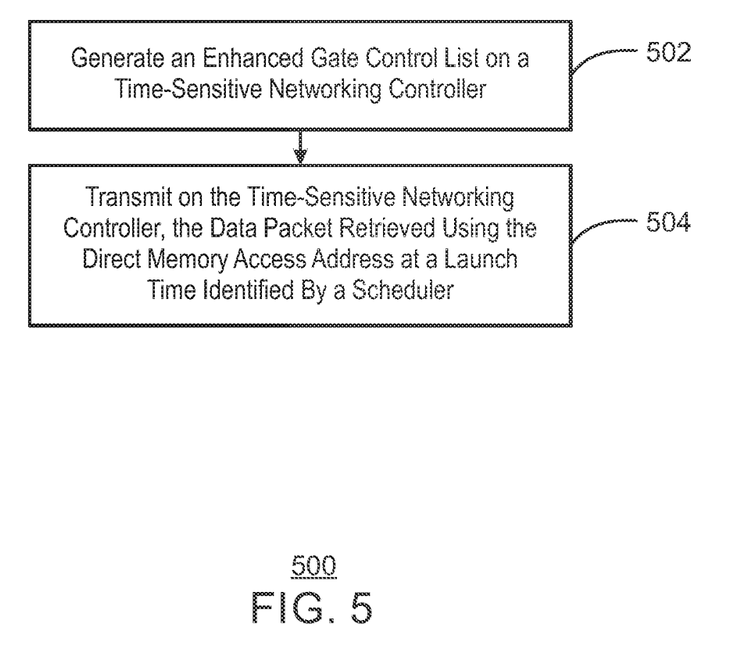
FIG. 5 is a flow chart illustrating an example method for time sensitive networking.

FIG. 5 is a flow chart illustrating an example method 500 for time sensitive networking. The example method is generally referred to by the reference number 500 and can be implemented using the system 400 of FIG. 5 above.

At block 502, the method includes generating an enhanced gate control list on a time-sensitive networking controller, the enhanced gate control list comprising a direct memory access address, a launch time, and a pre-fetch time for a data packet. In an example, the EGCL includes a number of look-up queues, where each of the number of look-up queues includes a number of rows in which data packet information can be stored for retrieval by the scheduler. In an example, the number of look-up queues can correspond to a different traffic class where each different traffic class has a differing quality of service. In this example, the scheduler can compare a front-of-queue data packet in each of the number of look-up queues and pre-fetches a queue data packet with a scheduled launch time matching the current time of the scheduler. The scheduler may also compare a front-of-queue data packet in each of the number of look-up queues and pre-fetches a queue data packet where a sum of the scheduled launch time and transmit time of the queue data packet does not conflict with a scheduled launch of a future scheduled data packet.

At block 504, the method includes transmitting, with a transmitter on the time-sensitive networking controller, the data packet, the data packet retrieved using the direct memory access address at a launch time identified by a scheduler of the time-sensitive networking controller. In an example the transmitter may transmit the data packet retrieved using the direct memory access (DMA) address at a launch time identified by the scheduler. The NIC may be a time-sensitive networking controller that includes a packet buffer. In this example, a data packet can be transmitted from the packet buffer for which the data packet was requested by the scheduler at the pre-fetch time. The time-sensitive networking controller also may apply a virtual local area network labels to application requested data packets that are then sorted into a number of queues in maintained by the enhanced gate control logic, wherein the virtual local area network labels correspond to the traffic class of the application requested data packets in each of the number of queues. In an example, the transmitter, EGCL, and scheduler are all located local to the time-sensitive networking controller such as the NIC and the memory accesses using the DMA address do not include a query to a CPU.

The techniques disclosed in this specification can be executed in a single device. These techniques may also be accomplished through instructions executing on a computing device. These instructions may be packaged together as a single executable file. The instructions for accomplishing these disclosed techniques may also be packaged separately on a number of devices, packaged separately on a single device, or may be stored in a non-executable format. Instructions for accomplishing the disclosed techniques may be encrypted, compressed, or otherwise prepared for file storage, security, or transport to a variety of computer and network technologies. These instructions may be stored on a single storage device or split among several devices including a number of servers in various geographic locations. In an example, a single manager or controller file may instruct or include instructions for the provision of the instructions of the disclosed techniques in whole or in part to a single device or a number of devices. Whether the instructions execute through a single device or a number of devices, the instructions enabling the disclosed capabilities are contemplated as part of the present disclosure regardless of how they are stored, transported, or executed with regards to the number or location of devices involved in execution. The pieces of the instructions may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques.

Figure 6:
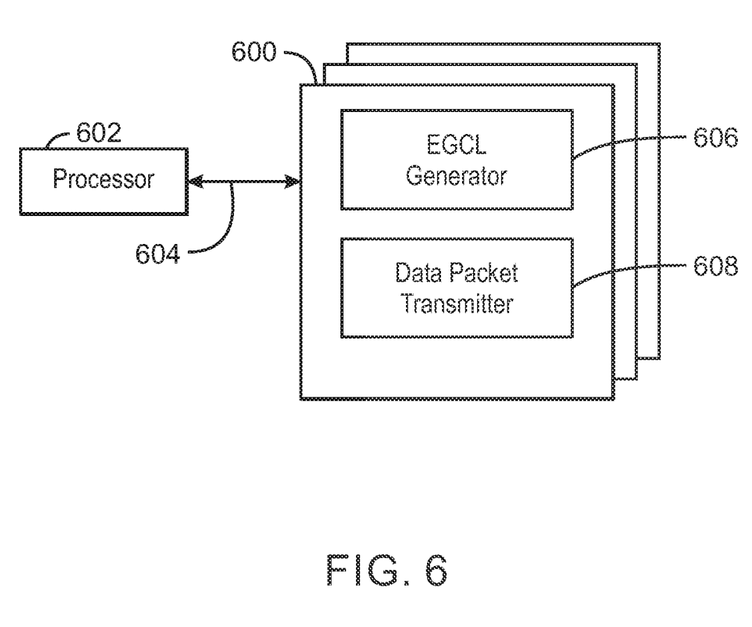
FIG. 6 is a block diagram showing example computer readable media that stores code for time sensitive networking.

FIG. 6 is a block diagram showing example computer readable media 600 that stores code for time sensitive networking. The computer readable media 600 may be accessed by a processor 602 over a computer bus 604. As a note, the present disclosure relates to direct memory accesses (DMAs) that bypass at least one processor. Accordingly, while FIG. 6 shows a processor 602, another processor may be bypassed by the actions of the scheduler, EGCL, and transmitter in pre-fetching and scheduling, data packets for transmission. So long as the activity and direct memory requests are kept within the controller or processor of a single component, this can offload the stress or workload of another controller that would have otherwise had to field memory access address requests.

Accordingly, the computer readable medium 600 may include code configured to direct the processor 602 to perform the methods described herein. In some embodiments, the computer readable media 600 may be non-transitory computer readable media. In some examples, the computer readable media 600 may be storage media. However, in any case, the computer readable media do not include transitory media such as carrier waves, signals, and the like.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

The various software components discussed herein may be stored on one or more computer readable media 600, as indicated in FIG. 6. For example, an EGCL generator 606 can generate an enhanced gate control list maintained on the time-sensitive networking controller, or potentially in this case the processor 602. The generated EGCL can include a direct memory access address to the main memory of a system as well as a launch time and a pre-fetch time for a data packet. The processor 602 can execute instructions stored in the data packet transmitter 608 to transmit the data packet retrieved using the direct memory access address to the main memory at a launch time identified by the scheduler.

In an example, a time-sensitive networking controller, which in this case may be the processor 602 can include a packet buffer. In this example, the data packet can be transmitted from the packet buffer for which the data packet was requested by the scheduler at the pre-fetch time. In an example, the enhanced gate control list can include a number of look-up queues, where each of the number of look-up queues includes a number of rows in which data packet information can be stored for retrieval by the scheduler. In this example, each of the number of look-up queues corresponds to a different traffic class where each different traffic class has a differing quality of service. The transmitter, enhanced gate control list, and scheduler are all located local to the time-sensitive networking controller, in this case the processor 602 and the memory accesses using the direct memory access address to the main memory are initiated and completed without communication between the time-sensitive networking controller, such as the processor 602 and another distinct processor.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

Figure 7:
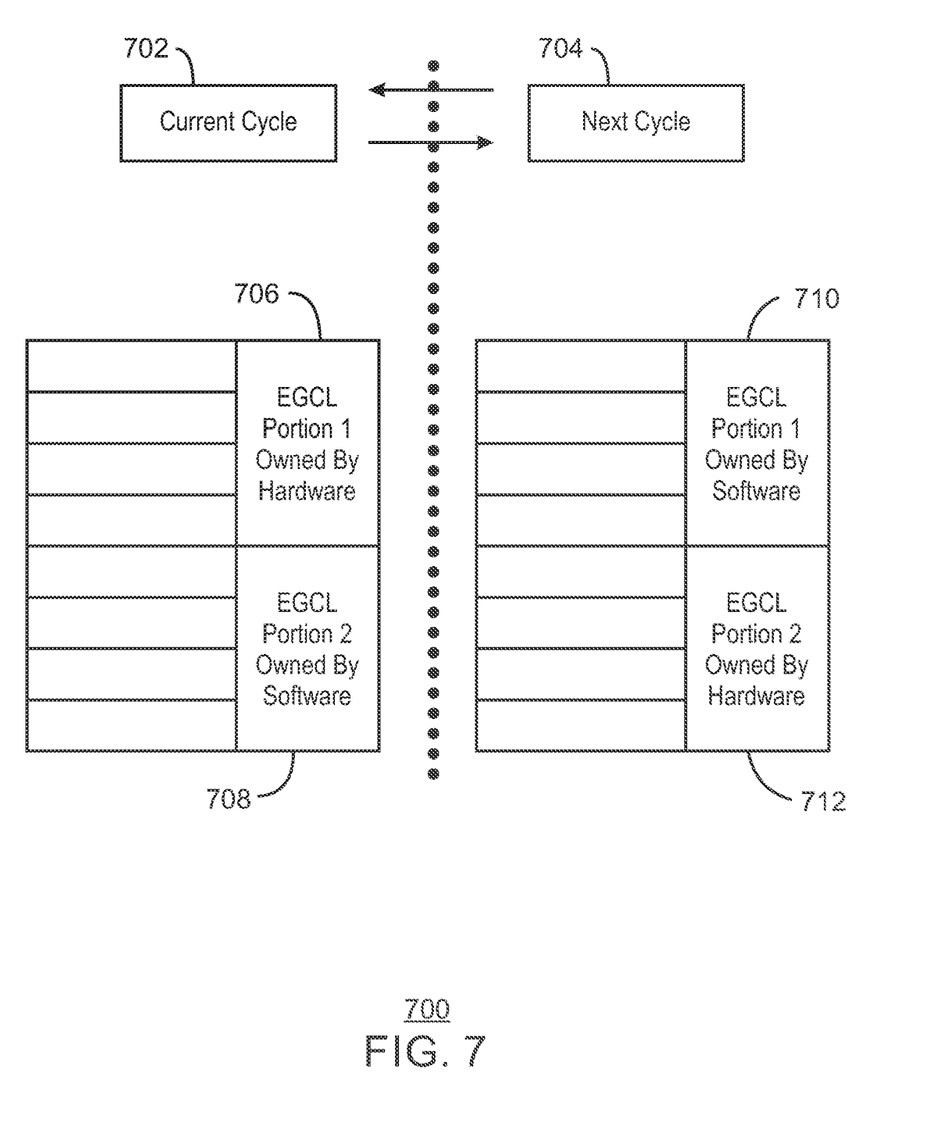
FIG. 7 is a schematic of an example enhanced gate control list for dynamic memory storage scenarios.

FIG. 7 is a schematic of an example enhanced gate control list for dynamic memory storage scenarios 700. As used herein, dynamic storage refers to the data being stored dynamically. Data that is dynamically stored refers to data that is stored at different locations at different times. The result of data being stored in different places it the address of these data locations need to be updated in a gate control list dynamically as the data locations change. In dynamic memory storage scenarios 700, the address location for data packets may change over time. The retrieval of a new or changing data location in memory at launch time of the data would result in delays or offsets from the time determinism the enhanced gate control list accomplished with the scheduler. To account for systems, components, and devices that use dynamic memory, the control of the enhanced gate control list portions may change one cycle of time to the next. FIG. 7 shows an enhanced gate control list in both a current cycle 702 and a next cycle 704. In the current cycle 702, the enhanced gate control list has a first portion 706 for which the rows of the queue give control, or are owned, by the hardware. In an example, ownership of rows of a queue in the enhanced gate control list allow the hardware, for example a NIC and scheduler to access and modify the row information. This access could be to update the current location of the data for each of the rows contained in portion 1 706 controlled by the hardware.

The other portion of the enhanced gate control list during the current cycle 702, is portion 2 708 which would be owned by the software application. In this context, ownership corresponds to control by the software application that is manipulating or accessing the data packets stored at the memory locations indicated by the specific rows of the enhanced gate control list in portion 2 708. As the operations of both the hardware and software could alter the locations of the data corresponding to the rows of the look-up table portions they control, in the next cycle 704, ownership of the portions flip. Accordingly, in the next cycle 704, portion 1 of the enhanced gate control list is owned and accessed by the software application 710. Also in the next cycle 704, portion 2 of the enhanced gate control list is owned, accessed, and updated by the hardware 712.

The switching between ownership of these two look-up table portions of the enhanced gate control list allows refresh of memory locations while access to the enhanced gate control list is still enabled for the application. This cycling can occur between a current cycle 702 corresponding to a first frame and next cycle 704 corresponding to a next frame. Accordingly, the ownership of portions of the enhanced gate control list can reset or flip with each frame of data. Using this model, while an active look-up table portion of the enhanced gate control list is accessed by the hardware, the second portion of the look-up table for the enhanced gate control list is accessed by the application.

In another embodiment, the portions need not be contiguous or evenly split, but may also be a variety of rows in the enhanced gate control list as identified by the control bits. In an example, the control bits may be identified in the status of the packet 312 information of the enhanced gate control list. In an example, the control bits are used to set ownership and the ownership is mutually exclusive between hardware and software applications. In an example, while the hardware is processing on portion of the enhanced gate control list, the second look-up table of the enhanced gate control list can be updated by the application. In these dynamic memory location systems, the ownership of these enhanced gate control lists can switch back and forth repeatedly between hardware and application ownership from cycle to cycle to provide seamless data flow.

EXAMPLES

Example 1

In an example, the device for time sensitive networking, including a time-sensitive networking controller, a scheduler of the time-sensitive networking controller, an enhanced gate control list maintained on the time-sensitive networking controller to include a direct memory access address, a launch time, and a pre-fetch time for a data packet, an a transmitter of the time-sensitive networking controller to transmit the data packet retrieved using the direct memory access address at the launch time identified by the scheduler.

The example devices described here may also include where time-sensitive networking controller includes a packet buffer; and the data packet is transmitted from the packet buffer for which the data packet was requested by the scheduler at the pre-fetch time. The example devices described here may also include wherein the enhanced gate control list includes a number of look-up queues, where each of the number of look-up queues includes a number of rows in which data packet information is be stored for retrieval by the scheduler. The example devices described here may also include wherein each of the number of look-up queues corresponds to a different traffic class where each different traffic class has a differing quality of service. The example devices described here may also include wherein the scheduler compares a front-of-queue data packet in each of the number of look-up queues and pre-fetches a queue data packet with a scheduled launch time matching the current time of the scheduler. The example devices described here may also include wherein the scheduler compares a front-of-queue data packet in each of the number of look-up queues and pre-fetches a queue data packet where a sum of the scheduled launch time and transmit time of the queue data packet does not conflict with a scheduled launch of a future scheduled data packet. The example devices described here may also include the transmitter of the time-sensitive networking controller is to transmit in a deterministic transmission without making a request through a CPU for an address of the data packet. The example devices described here may also include the time-sensitive networking controller is a networking interface controller. The example devices described here may also include the time-sensitive networking controller applies virtual local area network labels to application requested data packets that are then sorted into a number of queues in maintained by the enhanced gate control logic, wherein the virtual local area network labels correspond to the traffic class of the application requested data packets in each of the number of queues. The example devices described here may also include the transmitter, enhanced gate control list, and scheduler are all located local to the time-sensitive networking controller and memory accesses using the direct memory access address do not include a query to a CPU.

Example 2

In an example, the method for time-sensitive networking can include generating an enhanced gate control list on a time-sensitive networking controller, the enhanced gate control list including a direct memory access address, a launch time, and a pre-fetch time for a data packet, and transmitting, with a transmitter on the time-sensitive networking controller, the data packet, the data packet retrieved using the direct memory access address at the launch time identified by a scheduler of the time-sensitive networking controller.

The example methods described here may also include the time-sensitive networking controller includes a packet buffer, and the data packet is transmitted from the packet buffer for which the data packet was requested by the scheduler at the pre-fetch time. The example methods described here may also include the enhanced gate control list includes a number of look-up queues, where each of the number of look-up queues includes a number of rows in which data packet information is be stored for retrieval by the scheduler. The example methods described here may also include each of the number of look-up queues corresponds to a different traffic class where each different traffic class has a differing quality of service. The example methods described here may also include the scheduler compares a front-of-queue data packet in each of the number of look-up queues and pre-fetches a queue data packet with a scheduled launch time matching the current time of the scheduler.

The example methods described here may also include that the scheduler compares a front-of-queue data packet in each of the number of look-up queues and pre-fetches a queue data packet where a sum of the scheduled launch time and transmit time of the queue data packet does not conflict with a scheduled launch of a future scheduled data packet. The example methods described here may also include the transmitter of the time-sensitive networking controller is to transmit in a deterministic transmission without making a request through a CPU for an address of the data packet. The example methods described here may also include the time-sensitive networking controller is a networking interface controller. The example methods described here may also include the time-sensitive networking controller applies virtual local area network labels to application requested data packets that are then sorted into a number of queues in maintained by the enhanced gate control logic, wherein the virtual local area network labels correspond to the traffic class of the application requested data packets in each of the number of queues. The example methods described here may also include the transmitter, enhanced gate control list, and scheduler are all located local to the time-sensitive networking controller and memory accesses using the direct memory access address do not include a query to a CPU.

Example 3

In an example, the system for time sensitive networking may include a processor, a main memory, a time-sensitive networking controller, a scheduler of the time-sensitive networking controller, an enhanced gate control list maintained on the time-sensitive networking controller to include a direct memory access address to the main memory, a launch time, and a pre-fetch time for a data packet, and a transmitter of the time-sensitive networking controller to transmit the data packet retrieved using the direct memory access address to the main memory at the launch time identified by the scheduler.

The example systems described here may also include the time-sensitive networking controller includes a packet buffer, and the data packet is transmitted from the packet buffer for which the data packet was requested by the scheduler at the pre-fetch time. The example systems described here may also include the enhanced gate control list includes a number of look-up queues, where each of the number of look-up queues includes a number of rows in which data packet information is be stored for retrieval by the scheduler. The example systems described here may also include each of the number of look-up queues corresponds to a different traffic class where each different traffic class has a differing quality of service. The example systems described here may also include the transmitter, enhanced gate control list, and scheduler are all located local to the time-sensitive networking controller and memory accesses using the direct memory access address to the main memory are initiated and completed without communication between the time-sensitive networking controller and the processor.

Example 4

In an example, at least one non-transitory machine-readable medium having instructions stored therein that, in response to being executed on a computing device, causes the computing device to generate an enhanced gate control list on a time-sensitive networking controller, the enhanced gate control list comprising a direct memory access address, a launch time, and a pre-fetch time for a data packet. The example machine-readable medium may also transmit, with a transmitter on the time-sensitive networking controller, the data packet, the data packet retrieved using the direct memory access address at the launch time identified by a scheduler of the time-sensitive networking controller.

Example 5

An example apparatus can include a time-sensitive networking controller, a means for scheduling the time-sensitive networking controller, an enhanced gate control list maintained on the time-sensitive networking controller to include a direct memory access address, a launch time, and a pre-fetch time for a data packet, and a means for transmitting the data packet retrieved using the direct memory access address at the launch time identified by the a means for scheduling.

The example apparatus described can also include the time-sensitive networking controller comprises a packet buffer, and the data packet is transmitted from the packet buffer for which the data packet was requested by the a means for scheduling at the pre-fetch time. The example systems described here can also include the enhanced gate control list comprises a plurality of look-up queues, where each of the plurality of look-up queues includes a number of rows in which data packet information is be stored for retrieval by the a means for scheduling. The example systems described here can also include each of the plurality of look-up queues corresponds to a different traffic class where each different traffic class has a differing quality of service. The example systems described here can also include the a means for scheduling compares a front-of-queue data packet in each of the plurality of look-up queues and pre-fetches a queue data packet with a scheduled launch time matching the current time of the a means for scheduling.

The example systems described here can also include a means for scheduling compares a front-of-queue data packet in each of the plurality of look-up queues and pre-fetches a queue data packet where a sum of the scheduled launch time and transmit time of the queue data packet does not conflict with a scheduled launch of a future scheduled data packet. The example systems described here can also include the means for transmitting of the time-sensitive networking controller is to transmit in a deterministic transmission without making a request through a CPU for an address of the data packet.

The example systems described here can also include the time-sensitive networking controller is a networking interface controller. The example systems described here can also include the time-sensitive networking controller applies virtual local area network labels to application requested data packets that are then sorted into a plurality of queues in maintained by the enhanced gate control logic, wherein the virtual local area network labels correspond to the traffic class of the application requested data packets in each of the plurality of queues. The example systems described here can also include the means for transmitting, enhanced gate control list, and a means for scheduling are all located local to the time-sensitive networking controller and memory accesses using the direct memory access address do not include a query to a CPU.

While the present techniques have been described with respect to a limited number of embodiments, those skilled in the art can appreciate numerous modifications and variations therefrom. It is intended that the appended claims cover all such modifications and variations as fall within the true spirit and scope of this present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. In yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In the foregoing specification, a detailed description has been given with reference to specific embodiments. It may be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other language does not necessarily refer to the same embodiment or the same example, but may refer to different and distinct embodiments, as well as potentially the same embodiment.

What is claimed is:

1. A time-sensitive network interface controller, comprising:
    an enhanced gate control list to include a direct memory access address, a launch time, and a pre-fetch time for a data packet; and
    a transmitter to transmit the data packet retrieved using the direct memory access address at the launch time identified by a scheduler.

2. The time-sensitive network interface controller of claim 1, comprising:
    the scheduler; and
    a packet buffer, wherein the data packet is transmitted from the packet buffer for which the data packet was requested by the scheduler at the pre-fetch time.

3. The time-sensitive network interface controller of claim 2, wherein the scheduler compares a front-of-queue data packet in each of a plurality of look-up queues and pre-fetches a queue data packet with a scheduled launch time matching a current time of the scheduler.

4. The time-sensitive network interface controller of claim 1, wherein the enhanced gate control list comprises a plurality of look-up queues, where each of the plurality of look-up queues includes a number of rows in which data packet information is be stored for retrieval by the scheduler.

5. The time-sensitive network interface controller of claim 4, wherein each of the plurality of look-up queues corresponds to a different traffic class where each different traffic class has a differing quality of service.

6. The time-sensitive network interface controller of claim 4, wherein the scheduler compares a front-of-queue data packet in each of the plurality of look-up queues and pre-fetches a queue data packet, where a sum of a scheduled launch time and a transmit time of the queue data packet does not conflict with a scheduled launch of a future scheduled data packet.

7. The time-sensitive network interface controller of claim 4, wherein the scheduler compares a front-of-queue data packet in each of the plurality of look-up queues and pre-fetches a queue data packet where a sum of a scheduled launch time and a transmit time of the queue data packet does not conflict with a scheduled launch of a future scheduled data packet.

8. The time-sensitive network interface controller of claim 1, wherein the transmitter of the time-sensitive interface controller is to transmit in a deterministic transmission without making a request through a CPU for an address of the data packet.

9. The time-sensitive network interface controller of claim 1, wherein the time-sensitive interface controller applies virtual local area network labels to application requested data packets that are then sorted into a plurality of queues in maintained by the enhanced gate control list, wherein the virtual local area network labels correspond to a traffic class of the application requested data packets in each of the plurality of queues.

10. The time-sensitive network interface controller of claim 1, wherein memory accesses by the transmitter, enhanced gate control list, and scheduler use the direct memory access address that do not include a query to a CPU.

11. The time-sensitive network interface controller of claim 1, wherein the enhanced gate control list includes control bits, the control bits used to set ownership by either hardware or software.

12. The time-sensitive network interface controller of claim 11, wherein the enhanced gate control list is processed alternatively by hardware or software from cycle to cycle to provide seamless data flow.

13. A method comprising:
  maintaining an enhanced gate control list to include a direct memory access address, a launch time, and a pre-fetch time for a data packet; and
  transmitting the data packet retrieved using the direct memory access address at the launch time identified by a scheduler.

14. The method of claim 13, wherein transmitting the data packet comprises transmitting the data packet from a packet buffer for which the data packet was requested by the scheduler at the pre-fetch time.

15. The method of claim 14, comprising comparing a front-of-queue data packet in each of a plurality of look-up queues and pre-fetches a queue data packet with a scheduled launch time matching a current time of the scheduler.

16. The method of claim 13, wherein the enhanced gate control list comprises a plurality of look-up queues, where each of the plurality of look-up queues includes a number of rows in which data packet information is be stored for retrieval by the scheduler.

17. The method of claim 16, wherein each of the plurality of look-up queues corresponds to a different traffic class where each different traffic class has a differing quality of service.

18. The method of claim 16, comprising comparing a front-of-queue data packet in each of the plurality of look-up queues and pre-fetches a queue data packet, where a sum of a scheduled launch time and a transmit time of the queue data packet does not conflict with a scheduled launch of a future scheduled data packet.

19. The method of claim 13, using the direct memory access address that do not include a query to a CPU to perform memory accesses.

20. The method of claim 13, wherein the enhanced gate control list includes control bits, the control bits used to set ownership by either hardware or software.

21. The method of claim 20, wherein the enhanced gate control list is processed alternatively by hardware or software from cycle to cycle to provide seamless data flow.

22. At least one non-transitory machine-readable medium including instructions, which when executed by a time-sensitive network interface controller, cause the time-sensitive network interface controller to perform operations comprising:
  maintaining an enhanced gate control list to include a direct memory access address, a launch time, and a pre-fetch time for a data packet; and
  transmitting the data packet retrieved using the direct memory access address at the launch time identified by a scheduler.

23. The at least one non-transitory machine-readable medium of claim 22, wherein the enhanced gate control list comprises a plurality of look-up queues, where each of the plurality of look-up queues includes a number of rows in which data packet information is be stored for retrieval by the scheduler.

24. The at least one non-transitory machine-readable medium of claim 22, wherein the enhanced gate control list includes control bits, the control bits used to set ownership by either hardware or software.

25. The at least one non-transitory machine-readable medium of claim 24, wherein the enhanced gate control list is processed alternatively by hardware or software from cycle to cycle to provide seamless data flow.

* * * * *